(12) United States Patent
Xue et al.

(10) Patent No.: US 9,391,868 B2
(45) Date of Patent: Jul. 12, 2016

(54) METHOD AND SENDING-END DEVICE FOR MEASURING PERFORMANCE INDICATOR OF SERVICE FLOW

(71) Applicant: Huawei Technologies Co., Ltd., Shenzhen (CN)

(72) Inventors: Jing Xue, Beijing (CN); Mengjiao Liao, Beijing (CN); Hongming Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 161 days.

(21) Appl. No.: 14/288,187

(22) Filed: May 27, 2014

(65) Prior Publication Data

US 2014/0313927 A1    Oct. 23, 2014

Related U.S. Application Data

(63) Continuation of application No. PCT/CN2012/083465, filed on Oct. 25, 2012.

(30) Foreign Application Priority Data

May 29, 2012    (CN) .......................... 2012 1 0171739

(51) Int. Cl.
*H04L 12/26* (2006.01)
*H04L 12/851* (2013.01)

(52) U.S. Cl.
CPC .............. *H04L 43/50* (2013.01); *H04L 43/08* (2013.01); *H04L 47/2408* (2013.01); *H04L 43/0829* (2013.01); *H04L 43/0852* (2013.01)

(58) Field of Classification Search
CPC ............ H04L 12/2602; H04L 12/2697; H04L 41/0213; H04L 41/0896; H04L 41/5022; H04L 43/00; H04L 43/08; H04L 43/12; H04L 43/16; H04L 43/024; H04L 43/026; H04L 43/50; H04L 43/062; H04L 43/087; H04L 43/106; H04L 43/0829; H04L 43/0852; H04L 47/2408
See application file for complete search history.

(56) References Cited

U.S. PATENT DOCUMENTS

| | | | |
|---|---|---|---|
| 5,793,976 A | * | 8/1998 | Chen ................... H04L 12/2697 370/252 |
| 2003/0110229 A1 | * | 6/2003 | Kulig ..................... H04L 63/10 709/207 |

(Continued)

FOREIGN PATENT DOCUMENTS

| | | |
|---|---|---|
| CN | 101056215 A | 10/2007 |
| CN | 101197737 A | 6/2008 |

(Continued)

OTHER PUBLICATIONS

Chen, M., et al., "BFD Extensions in Support of Performance Measurement," Internet Engineering Task Force (IETF), Mar. 10, 2009, 22 pages.

(Continued)

*Primary Examiner* — John Pezzlo
*Assistant Examiner* — Dharmesh Patel
(74) *Attorney, Agent, or Firm* — Slater Matsil, LLP

(57) ABSTRACT

A method for measuring a performance indicator of a service flow is disclosed. A sending-end device constructs a measurement packet. The measurement packet is used to trigger a receiving-end device to measure the performance indicator of the service flow. A forwarding attribute of the measurement packet is the same as a forwarding attribute of a packet in the service flow. The measurement packet is sent to the receiving-end device.

16 Claims, 2 Drawing Sheets

---

101
A sending-end device constructs a first measurement packet, where the first measurement packet is used to trigger a receiving-end device to measure a performance indicator of a service flow, a forwarding attribute of the first measurement packet is the same as a forwarding attribute of a packet in the service flow so that a forwarding path of the first measurement packet is the same as a forwarding path of the packet in the service flow and a forwarding priority of the first measurement packet is the same as a forwarding priority of the packet in the service flow, and the first measurement packet carries a first identifier used to indicate that the first measurement packet is not a packet in the service flow 102
The sending-end device sends the first measurement packet to the receiving-end device

(56) References Cited

U.S. PATENT DOCUMENTS

| | | | |
|---|---|---|---|
| 2007/0064611 A1* | 3/2007 | He | H04L 41/142 370/236.2 |
| 2008/0276001 A1 | 11/2008 | Menon | |
| 2011/0188857 A1* | 8/2011 | Zheng | H04L 12/6418 398/45 |
| 2012/0057497 A1 | 3/2012 | Song et al. | |
| 2013/0082522 A1 | 4/2013 | Zeng et al. | |

FOREIGN PATENT DOCUMENTS

| | | |
|---|---|---|
| CN | 102301651 A | 12/2011 |
| CN | 102685014 A | 9/2012 |
| EP | 2416527 A1 | 2/2012 |
| EP | 2432160 A1 | 3/2012 |

OTHER PUBLICATIONS

"Commercial IP Security Option (CIPSO 2.2)," IETF CIPSO Working Group, Jul. 16, 1992, 24 pages.

"Internet Protocol DARPA Internet Program, Protocol Specification," Defense Advanced Research Projects Agency, Sep. 1981, 49 pages.

Fenner, "Experimental Values in IPv4, IPv6, ICMPv4, ICMPv6, UDP, and TCP Headers," Network Working Group, Nov. 2006, 11 pages.

Floyd, et al., "Quick-Start for TCP and IP," Network Working Group, Jan. 2007, 82 pages.

Katz, "IP Router Alert Option," Network Working Group, Feb. 1997, 4 pages.

Kent, "U.S. Department of Dense Security Options for the Internet Protocol," Network Working Group, Nov. 1991, 17 pages.

Malkin, "Traceroute Using an IP Option," Network Working Group, Jan. 1993, 7 pages.

Mogul, et al., "Path MTU Discovery," Networking Working Group, Nov. 1990, 18 pages.

Narten, Assigning Experimental and Testing Numbers Considered Useful, Network Working Group, Jan. 2004, 7 pages.

Wang, "EIP: The Extended Internet Protocol A Framework for Maintaining Backward Compatibility," Network Working Group, Nov. 1992, 17 pages.

* cited by examiner

METHOD AND SENDING-END DEVICE FOR MEASURING PERFORMANCE INDICATOR OF SERVICE FLOW

This application is a continuation of International Application No. PCT/CN2012/083465, filed on Oct. 25, 2012, which claims priority to Chinese Patent Application No. 201210171739.X, filed on May 29, 2012, both of which are hereby incorporated by reference in their entireties.

TECHNICAL FIELD

The present application relates to the field of communication technologies and, in particular embodiments, to a method and a sending-end device for measuring a performance indicator of a service flow.

BACKGROUND

Performance of a network service flow may be measured by a performance indicator such as a packet loss ratio or latency.

In the prior art, when a performance indicator of a service flow between a sending-end device and a receiving-end device needs to be measured. The sending-end device intermittently inserts a dedicated protocol packet into the service flow to serve as a measurement packet and carries an original parameter counted by the sending-end device. For example, the number of packets in the service flow sent by the sending-end device during a period when two measurement packets are sent, in the measurement packet, so as to trigger the receiving-end device to perform a corresponding measurement action to obtain a measurement result. The measurement result obtained in this way may be inaccurate.

SUMMARY OF THE INVENTION

Embodiments of the present application provide a method and a sending-end device for measuring a performance indicator of a service flow, which can solve the problem in the prior art. A dedicated protocol packet is inserted intermittently into a service flow to serve as a measurement packet. It cannot be ensured that the measurement packet has a forwarding attribute consistent with that of a service in the service flow (the forwarding attribute includes a forwarding path and a forwarding priority), which may result in an inaccurate measurement result.

According to one aspect, an embodiment of the present application provides a method for measuring a performance indicator of a service flow. A sending-end device constructs a first measurement packet. The first measurement packet is used to trigger a receiving-end device to measure the performance indicator of the service flow. A forwarding attribute of the first measurement packet is the same as a forwarding attribute of a packet in the service flow so that a forwarding path of the first measurement packet is the same as a forwarding path of the packet in the service flow and a forwarding priority of the first measurement packet is the same as a forwarding priority of the packet in the service flow. The first measurement packet carries a first identifier used to indicate that the first measurement packet is not a packet in the service flow. The sending-end device sends the first measurement packet to the receiving-end device.

According to another aspect, an embodiment of the present application provides a sending-end device for measuring a performance indicator of a service flow. A packet construction unit is configured to construct a first measurement packet, where the first measurement packet is used to trigger a receiving-end device to measure the performance indicator of the service flow. A forwarding attribute of the first measurement packet is the same as a forwarding attribute of a packet in the service flow so that a forwarding path of the first measurement packet is the same as a forwarding path of the packet in the service flow and a forwarding priority of the first measurement packet is the same as a forwarding priority of the packet in the service flow. The first measurement packet carries a first identifier used to indicate that the first measurement packet is not a packet in the service flow. A packet sending unit is configured to send the first measurement packet to the receiving-end device.

For the method and the sending-end device for measuring the performance indicator of the service flow, the sending-end device sends, a measurement packet whose forwarding attribute is the same as that of the packet in the service flow to the receiving-end device, so as to trigger the receiving-end device to measure the performance indicator of the service flow. The measurement packet can be forwarded according to a path of the packet in the service flow and packet disordering does not occur, thereby improving accuracy of measuring the performance indicator of the service flow.

DETAILED DESCRIPTION OF ILLUSTRATIVE EMBODIMENTS

The following further describes the technical solutions of the embodiments of the present application in detail with reference to the accompanying drawings and embodiments.

Figure 1:
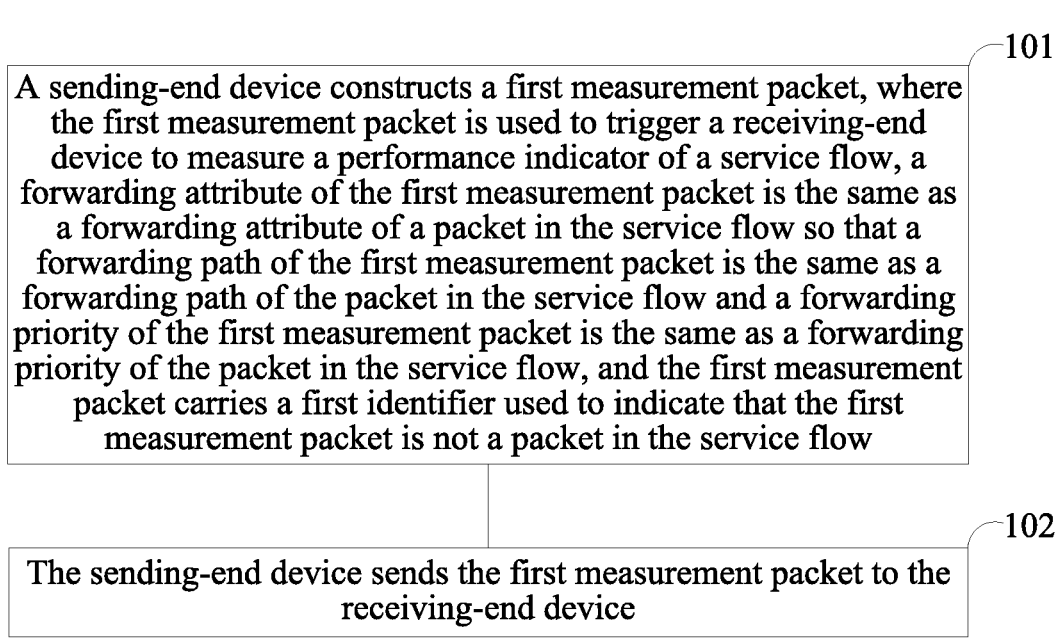
FIG. 1 is a flowchart of a method for measuring a performance indicator of a service flow according to an embodiment of the present application.

As shown in FIG. 1, an embodiment of the present application provides a method for measuring a performance indicator of a service flow, including the following steps.

101: A sending-end device constructs a first measurement packet, where the first measurement packet is used to trigger a receiving-end device to measure the performance indicator of the service flow. A forwarding attribute of the first measurement packet is the same as a forwarding attribute of a packet in the service flow so that a forwarding path of the first measurement packet is the same as a forwarding path of the packet in the service flow and a forwarding priority of the first measurement packet is the same as a forwarding priority of the packet in the service flow. The first measurement packet carries a first identifier used to indicate that the first measurement packet is not a packet in the service flow.

102: The sending-end device sends the first measurement packet to the receiving-end device.

For example, the sending-end device and the receiving-end device may be network devices such as a router and a switch, and the sending-end device forwards the service flow to the receiving-end device. When the performance indicator of the service flow needs to be measured, the sending-end device constructs the first measurement packet and sends the first measurement packet to the receiving-end device. The forwarding attribute of the first measurement packet is the same as the forwarding attribute of the packet in the service flow so that the first measurement packet and the packet in the service flow have the same forwarding path and forwarding priority. Adopting the same forwarding attribute ensures that packet disordering does not occur, where packet disorder refers to a situation in which a packet sent later arrives earlier. For example, a packet in the service flow sent after the first measurement packet arrives earlier at the receiving-end device, or the first measurement packet is not forwarded along the path of the service flow, so as to improve measurement result accuracy of the performance indicator of the service flow.

The first measurement packet carries the first identifier used to indicate that the first measurement packet is not a packet in the service flow.

Use the first measurement packet that is an IP (Internet Protocol, Internet Protocol) packet in Layer 3 protocol packets as an example. The first identifier may be carried in an option Options field of a header of the IP packet. For example, a newly defined option whose sequence number is 26. A forwarding path of the IP packet is determined by a quintuple in the header of the IP packet, namely, a source IP address (Source Address), a destination IP address (Destination Address), a protocol number (Protocol), a Transmission Control Protocol (Transmission Control Protocol, TCP) or a User Datagram Protocol (User Datagram Protocol, UDP) source port number (TCP or UDP Source Port), and a TCP or UDP destination port number (TCP or UDP Destination Port). The TCP and UDP source and destination port numbers are payload parts in the IP packet. A forwarding priority of the IP packet is determined by a type of service (Type of Service) in the header of the IP packet. The quintuple in the packet header of the first measurement packet is the same as a quintuple in a packet header of the packet in the service flow. The value of the type of service in the packet header of the first measurement packet is the same as the value of the type of service in the packet header of the packet in the service flow.

Use the first measurement packet that is an Ethernet packet in Layer 2 protocol packets as an example. There are two types of common Ethernet packets: one is an RFC894 Ethernet packet (namely, Ethernet II), and the other is an 802.1Q Ethernet packet. The first identifier may be carried in a type field of a header of the RFC894 Ethernet packet or a type length/type (Length/Type) field of the 802.1Q Ethernet packet. For example, a new type whose value is 0x1011. A forwarding path of the Ethernet packet is determined by a destination media access control address (Destination Media Access Control, DMAC) in a header of the Ethernet packet. The value of a DMAC in the packet header of the first measurement packet is the same as the value of a DMAC in the packet header of the packet in the service flow. An 802.1Q Tag field in a header of the 802.1Q Ethernet packet includes a priority PRI sub-field, a forwarding priority of the 802.1Q Ethernet packet is determined by the value of the priority sub-field, and the value of the priority in the packet header of the first measurement packet is the same as the value of the priority in the packet header of the packet in the service flow.

After receiving the packet in the service flow and the first measurement packet, the receiving-end device determines whether the first measurement packet carries the first identifier. For example, for the IP packet, the receiving-end device determines that the packet header of the first measurement packet has the option whose sequence number is 26. For the Ethernet packet, the receiving-end device determines that the value of the type field in the packet header of the first measurement packet is 0x1011. Therefore, it is known that the first measurement packet is not a packet in the service flow. Then, the receiving-end device starts a corresponding action of measuring the performance indicator of the service flow, and the performance indicator includes one or more of a packet loss ratio and a latency.

Optionally, if the performance indicator is a packet loss ratio, the sending-end device continues to send the service flow after sending the first measurement packet, and counts, within a preset interval, the number of packets in the service flow that are sent to the receiving-end device after the sending-end device sends the first measurement packet to the receiving-end device (for ease of subsequent description, the number is referred to as the number of packets sent by the sending-end device within a measurement interval). The preset interval may be an interval of time, or may also be an interval of the number of packets in the service flow. For example, the interval of time may be set to two seconds, or the interval may be also set to ten thousand packets in the service flow. After the counting is finished, the sending-end device constructs a second measurement packet, where a forwarding attribute of the second measurement packet is the same as the forwarding attribute of the packet in the service flow. The second measurement packet and the packet in the service flow have the same forwarding path and forwarding priority.

The sending-end device carries the number of packets sent by the sending-end device in the second measurement packet. Use the second measurement packet that is an IP packet as an example. The number of packets may be carried in a type length value (Type Length Value) in the option field whose sequence number is 26 in a packet header of the second measurement packet.

The sending-end device sends the second measurement packet to the receiving-end device.

For example, the number of packets sent by the sending-end device within the measurement interval may not be sent by using the second measurement packet, and may be carried in a protocol packet and sent to the receiving-end device. The protocol packet is named so to be distinguished from a measurement packet. A forwarding attribute of the protocol packet is different from that of the packet in the service flow. Strict order preserving is not required for the protocol packet and the packet in the service flow. For example, the sending-end device constructs a first protocol packet, where the first protocol packet carries the number of packets sent by the sending-end device within the measurement interval and a packet header of the first protocol packet is different from the packet header of the packet in the service flow. In this case, the second measurement packet may be constructed first. The number of packets sent by the sending-end device within the measurement interval is then counted. After the counting is finished, the second measurement packet is sent.

Accordingly, after the receiving-end device receives the first measurement packet and the second measurement packet, an action of measuring the performance indicator of the service flow by the device is triggered. For example, after the first measurement packet is received, a counter is started to count the number of packets in the service flow that arrive after the first measurement packet. When the second measurement packet is received, a value of the counter is recorded. The value corresponds to the number of received packets in the service flow that arrive after the first measurement packet and until the second measurement packet is received (for ease of subsequent description, the number is referred to as the number of packets received by the receiving-end device within a measurement interval). The receiving-end device obtains the number of packets sent by the sending-end device within the measurement interval from the received second measurement packet or the received first protocol packet and determines the packet loss ratio of the service flow.

For example, the number of packets sent by the sending-end device within the measurement interval is 1000, and the number of packets received by the receiving-end device within the measurement interval is 999, so that it is determined that the packet loss ratio of the service flow is one thousandth.

Optionally, the performance indicator can be a latency.

The first measurement packet may carry time information indicating time at which the measurement packet is sent. Use the first measurement packet that is an IP packet as an example. The time information may be carried in a type length value (TLV) in an option field whose sequence number is 26 in the packet header of the first measurement packet. Definitely, the sending-end device may also construct a second protocol packet, and carry the time information in the second protocol packet and send the time information to the receiving-end device (the second protocol packet has the same type as the first protocol packet).

Accordingly, the receiving-end device records the time at which the first measurement packet is received and calculates the latency of the service flow.

A packet type of the service flow includes a Layer 2 protocol packet or a Layer 3 protocol packet. This embodiment of the present application may be used to measure performance indicators of a Layer 2 service flow and a Layer 3 service flow. This embodiment of the present application uses an IP packet and an Ethernet packet as an example. However, the same concept may be extended to other Layer 2 protocols, such as asynchronous transfer mode (Asynchronous Transfer Mode, ATM), Point-to-Point Protocol (PPP), frame relay (FR), and High Level Data Link Control (HDLC).

Optionally, the sending-end device may periodically send a measurement packet to the receiving-end device.

In this embodiment of the present application, a packet type of the first protocol packet and the second protocol packet may be the same as or may also be different from the packet type of the packet in the service flow. The first protocol packet and the second protocol packet can carry the time information indicating time at which the sending-end device sends the measurement packet or the number of packets sent by the sending-end device within the measurement interval.

For the method for measuring a performance indicator of a service flow, a sending-end device sends a measurement packet whose forwarding attribute is the same as that of a packet in the service flow to a receiving-end device, so as to trigger the receiving-end device to measure the performance indicator of the service flow. The measurement packet may be forwarded according to a path of the packet in the service flow and packet disordering does not occur, thereby improving accuracy of measuring the performance indicator of the service flow.

Figure 2:
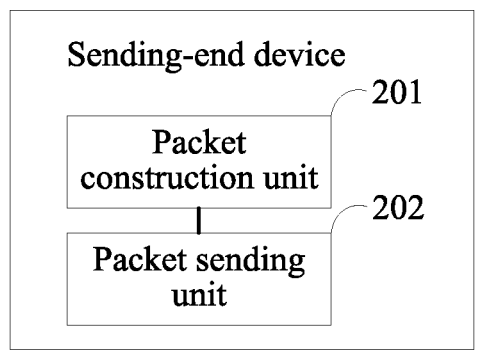
FIG. 2 is a schematic diagram of a sending-end device for measuring a performance indicator of a service flow according to an embodiment of the present application.

Referring to FIG. 2, an embodiment of the present application provides a sending-end device for measuring a performance indicator of a service flow, including the following. A packet construction unit 201, configured to construct a first measurement packet, where the first measurement packet is used to trigger a receiving-end device to measure the performance indicator of the service flow. A forwarding attribute of the first measurement packet is the same as a forwarding attribute of a packet in the service flow so that a forwarding path of the first measurement packet is the same as a forwarding path of the packet in the service flow and a forwarding priority of the first measurement packet is the same as a forwarding priority of the packet in the service flow. The first measurement packet carries a first identifier used to indicate that the first measurement packet is not a packet in the service flow.

A packet sending unit 202, configured to send the first measurement packet to the receiving-end device.

Figure 3:
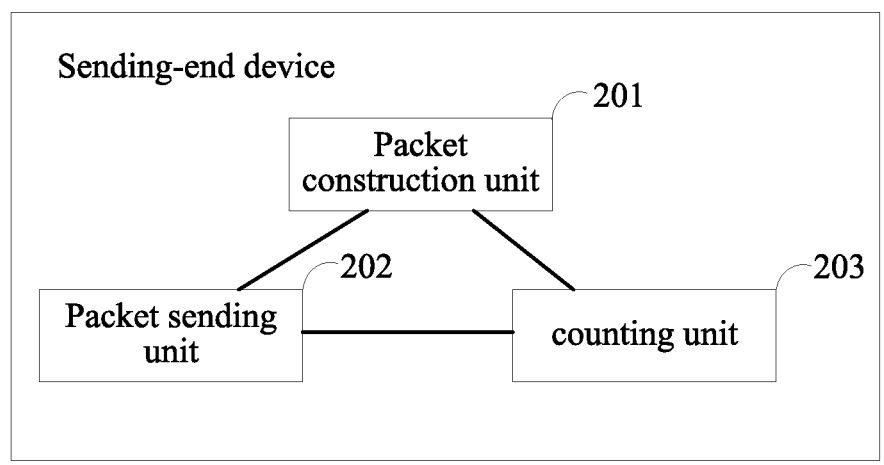
FIG. 3 is a schematic diagram of another sending-end device for measuring a performance indicator of a service flow according to an embodiment of the present application.

For example, if the performance indicator is a packet loss ratio, the first measurement packet is specifically used to trigger the receiving-end device to start to count the number of received packets in the service flow. Reference is now made to FIG. 3.

The packet construction unit 201 is further configured to construct a second measurement packet, where the second measurement packet is used to trigger the receiving-end device to record the number of received packets in the service flow. A forwarding attribute of the second measurement packet is the same as the forwarding attributes of the packets in the service flow so that a forwarding path of the second measurement packet is the same as the forwarding paths of the packets in the service flow and a forwarding priority of the second measurement packet is the same as the forwarding priorities of the packets in the service flow. The second measurement packet carries a second identifier used to indicate that the second measurement packet is not a packet in the service flow.

The sending-end device further includes a counting unit 203, configured to count, within a preset interval, the number of packets in the service flow that are sent to the receiving-end device after the sending-end device sends the first measurement packet to the receiving-end device.

Accordingly, the packet sending unit 202 is further configured to send the second measurement packet and the number of packets to the receiving-end device after the counting unit 203 finishes counting the number of packets.

In an example, the number of packets is carried in the second measurement packet. Accordingly, the packet construction unit 201 is configured to construct the second measurement packet after the counting unit 203 finishes counting the number of packets.

In another example, the packet construction unit 201 is further configured to construct a first protocol packet, where the first protocol packet carries the number of packets. A forwarding attribute of the first protocol packet is different from the forwarding attributes of the packets in the service flow so that a forwarding path of the first protocol packet is different from the forwarding paths of the packets in the service flow or a forwarding priority of the first protocol packet is different from the forwarding priorities of the packets in the service flow.

For example, if the performance indicator is a latency, the first measurement packet further carries a timestamp indicating time at which the first measurement packet is sent.

For example, if the performance indicator is a latency, the packet construction unit 201 is further configured to construct a second protocol packet. The second protocol packet carries the timestamp indicating time at which the first measurement packet is sent. A forwarding attribute of the second protocol packet is different from the forwarding attribute of the packet in the service flow so that a forwarding path of the second protocol packet is different from the forwarding path of the packet in the service flow or a forwarding priority of the second protocol packet is different from the forwarding priority of the packet in the service flow.

Accordingly, the packet sending unit 202 is further configured to send the second protocol packet to the receiving-end device.

For the sending-end device for measuring a performance indicator of a service flow, the sending-end device sends a measurement packet whose forwarding attribute is the same as that of a packet in the service flow to a receiving-end device. This is so as to trigger the receiving-end device to measure a performance indicator of the service flow, where the measurement packet may be forwarded according to a path of the packet in the service flow and packet disordering does not occur, thereby improving accuracy of measuring the performance indicator of the service flow.

For example, the units in the embodiments shown in FIG. 2 and FIG. 3 may be combined into one or more units.

For example, all the units may be implemented by using hardware. A person of ordinary skill in the art may understand that all or a part of the steps of methods in the embodiments may be implemented by a program instructing relevant hardware. The program may be stored in a computer readable storage medium. For example, the storage medium may include: a ROM, a RAM, a magnetic disk, or an optical disc.

The method and the sending-end device for measuring a performance indicator of a service flow according to the embodiments of the present application are described above in detail. However, the descriptions of the foregoing embodiments are merely intended to help understand the method and idea of the present application, and shall not be construed as a limitation on the present application. Any variation or replacement readily figured out by a person skilled in the art within the technical scope disclosed in the present application shall fall within the protection scope of the present application.

What is claimed is:

1. A method for measuring a performance indicator of a service flow, the method comprising:
   constructing, by a sending-end device, a first measurement packet, wherein the first measurement packet is used to trigger a receiving-end device to measure the performance indicator of the service flow, wherein a forwarding attribute of the first measurement packet is the same as a forwarding attribute of a packet in the service flow, and wherein the first measurement packet carries a first identifier that indicates that the first measurement packet is not a packet in the service flow; and
   sending, by the sending-end device, the first measurement packet to the receiving-end device;
   wherein, if the performance indicator is a packet loss ratio, the first measurement packet is used to trigger the receiving-end device to start to count a number of received packets in the service flow; and
   wherein the method further comprises performing, in response to the performance indicator being the packet loss ratio:
   constructing, by the sending-end device, a second measurement packet, wherein the second measurement packet is used to trigger the receiving-end device to record the number of received packets in the service flow, wherein a forwarding attribute of the second measurement packet is the same as the forwarding attributes of the packets in the service flow, and wherein the second measurement packet carries a second identifier used to indicate that the second measurement packet is not a packet in the service flow;
   counting, by the sending-end device within a preset interval, a number of packets in the service flow that are sent to the receiving-end device after the sending-end device sends the first measurement packet to the receiving-end device; and
   sending, by the sending-end device, the second measurement packet and the number of packets to the receiving-end device when counting of the number of packets is finished;
   wherein the sending the second measurement packet comprises:
   sending, by the sending-end device, the second measurement packet to the receiving-end device;
   constructing, by the sending-end device, a first protocol packet, wherein the first protocol packet carries the number of packets and wherein a forwarding attribute of the first protocol packet is different from the forwarding attributes of the packets in the service flow; and
   sending, by the sending-end device, the first protocol packet to the receiving-end device.

2. The method according to claim 1, wherein, if the performance indicator is a latency, the first measurement packet further carries a timestamp indicating time at which the first measurement packet is sent.

3. The method according to claim 1, wherein the method further comprises performing, in response to the performance indicator being a latency;
   constructing, by the sending-end device, a second protocol packet, wherein the second protocol packet carries a timestamp indicating time at which the first measurement packet is sent, and a forwarding attribute of the second protocol packet is different from the forwarding attribute of the packet in the service flow; and
   sending, by the sending-end device, the second protocol packet to the receiving-end device.

4. The method according to claim 1, wherein the packet in the service flow comprises a Layer 2 protocol packet.

5. The method according to claim 1, wherein the packet in the service flow comprises a Layer 3 protocol packet.

6. The method according to claim 1, wherein the first indicator is carried in a header of the first measurement packet in one of an option field, a type field, and a length/type field.

7. The method according to claim 1, wherein a forwarding priority of the first measurement packet is determined by a type of service in a header of the first measurement packet, and wherein a value of the type of service in the header of the first measurement packet is the same as a value of a type of service in a header of the packet in the service flow.

8. The method according to claim 1, wherein the first measurement packet carries the first identifier further indicates that the first measurement packet is a measurement packet.

9. A sending-end device for measuring a performance indicator of a service flow, the sending-end device comprising a computer including a non-transitory computer-readable medium storing program units executable by the computer, the units including:
   a packet construction unit, configured to construct a first measurement packet, wherein the first measurement packet is used to trigger a receiving-end device to measure the performance indicator of the service flow, wherein a forwarding attribute of the first measurement packet is the same as a forwarding attribute of a packet in the service flow, and wherein the first measurement packet carries a first identifier that indicates that the first measurement packet is not a packet in the service flow;
   a packet sending unit, configured to send the first measurement packet to the receiving-end device, wherein the first measurement packet is used to trigger the receiving-end device to start to count a number of received packets in the service flow, wherein the packet construction unit is further configured to construct a second measurement packet, wherein, when the performance indicator is a packet loss ratio, the second measurement packet is used to trigger the receiving-end device to record the number of received packets in the service flow, and a forwarding attribute of the second measurement packet is the same as the forwarding attributes of the packets in the service flow, and wherein the second measurement packet carries a second identifier used to indicate that the second measurement packet is not a packet in the service flow; and a counting unit, configured to count, within a preset interval and in response to the performance indicator being the packet loss ratio, a number of packets in the service flow that are sent to the receiving-end device after the sending-end device sends the first measurement packet to the receiving-end device;

wherein the packet construction unit is further configured to construct a first protocol packet in response to the performance indicator being the packet loss ratio, wherein the first protocol packet carries the number of packets, and wherein a forwarding attribute of the first protocol packet is different from the forwarding attributes of the packets in the service flow;

wherein the packet sending unit is further configured to send the second measurement packet and the first protocol packet to the receiving-end device after the counting unit finishes counting the number of packets and in response to the performance indicator being the packet loss ratio.

10. The sending-end device according to claim 9, wherein, if the performance indicator is a latency, the first measurement packet further carries a timestamp indicating time at which the first measurement packet is sent.

11. The sending-end device according to claim 9, wherein the packet construction unit is further configured to construct a second protocol packet in response to the performance indicator being a latency, wherein the second protocol packet carries a timestamp indicating time at which the first measurement packet is sent, and wherein a forwarding attribute of the second protocol packet is different from the forwarding attribute of the packet in the service flow; and wherein the packet sending unit is further configured to send the second protocol packet to the receiving-end device in response to the performance indicator being a latency.

12. The sending-end device according to claim 9, wherein the first indicator is carried in a header of the first measurement packet in one of an option field, a type field, and a length/type field; and wherein a forwarding priority of the first measurement packet is determined by a type of service in a header of the first measurement packet, and wherein a value of the type of service in the header of the first measurement packet is the same as a value of a type of service in a header of the packet in the service flow.

13. The sending-end device according to claim 9, wherein the first measurement packet carries the first identifier further indicates that the first measurement packet is a measurement packet.

14. A sending-end device for measuring a performance indicator of a service flow, comprising:

a packet construction unit, configured to construct a first measurement packet, wherein the first measurement packet is used to trigger a receiving-end device to measure the performance indicator of the service flow, wherein a forwarding attribute of the first measurement packet is the same as a forwarding attribute of a packet in the service flow, and wherein the first measurement packet carries a first identifier that indicates that the first measurement packet is not a packet in the service flow;

a packet sending unit, configured to send the first measurement packet to the receiving-end device, wherein the first measurement packet is used to trigger the receiving-end device to start to count a number of received packets in the service flow, wherein the packet construction unit is further configured to construct a second measurement packet, wherein, when the performance indicator is a packet loss ratio, the second measurement packet is used to trigger the receiving-end device to record the number of received packets in the service flow, and a forwarding attribute of the second measurement packet is the same as the forwarding attributes of the packets in the service flow, and wherein the second measurement packet carries a second identifier used to indicate that the second measurement packet is not a packet in the service flow; and a counting unit, configured to count, within a preset interval and in response to the performance indicator being the packet loss ratio, a number of packets in the service flow that are sent to the receiving-end device after the sending-end device sends the first measurement packet to the receiving-end device;

wherein the packet construction unit is further configured to construct a first protocol packet in response to the performance indicator being the packet loss ratio, wherein the first protocol packet carries the number of packets, and wherein a forwarding attribute of the first protocol packet is different from the forwarding attributes of the packets in the service flow;

wherein the packet sending unit is further configured to send the second measurement packet and the first protocol packet to the receiving-end device after the counting unit finishes counting the number of packets and in response to the performance indicator being the packet loss ratio.

15. The sending-end device according to claim 14, wherein the first indicator is carried in a header of the first measurement packet in one of an option field, a type field, and a length/type field; and wherein a forwarding priority of the first measurement packet is determined by a type of service in a header of the first measurement packet, and wherein a value of the type of service in the header of the first measurement packet is the same as a value of a type of service in a header of the packet in the service flow.

16. The sending-end device according to claim 14, wherein the first measurement packet carries the first identifier further indicates that the first measurement packet is a measurement packet.

* * * * *